United States Patent [19]

Harmon

[11] Patent Number: 4,881,866
[45] Date of Patent: Nov. 21, 1989

[54] GLASS HANDLING APPARATUS

[75] Inventor: John R. Harmon, Genoa, Ohio

[73] Assignee: Libbey-Owens-Ford Co., Toledo, Ohio

[21] Appl. No.: 209,524

[22] Filed: Jun. 21, 1988

[51] Int. Cl.⁴ .................................................. B66F 9/18
[52] U.S. Cl. ...................................... 414/607; 187/24; 414/622
[58] Field of Search ............... 414/607, 608, 622, 663, 414/619–621, 623; 294/67.2, 67.22; 187/24

[56] References Cited

U.S. PATENT DOCUMENTS

| | | | |
|---|---|---|---|
| 2,325,235 | 7/1943 | Esbeck | 294/67.22 |
| 2,593,820 | 4/1952 | Weiss | 414/622 |
| 3,100,623 | 8/1963 | Pedersen | 187/24 X |
| 3,455,476 | 7/1969 | Grigsby | 414/607 |
| 3,643,825 | 2/1972 | Zane, Jr. | 414/607 |
| 3,726,424 | 4/1973 | Du Puis et al. | 414/607 |
| 3,757,977 | 9/1973 | Brudi et al. | 414/607 |
| 4,285,626 | 8/1981 | Donato | 414/622 |
| 4,394,106 | 7/1983 | Frees et al. | 414/622 |
| 4,659,277 | 4/1987 | Widener | 414/622 X |

FOREIGN PATENT DOCUMENTS

| | | | |
|---|---|---|---|
| 493629 | 6/1953 | Canada | 414/619 |
| 975716 | 10/1975 | Canada | 414/607 |
| 2309845 | 9/1973 | Fed. Rep. of Germany | 414/622 |
| 714482 | 9/1954 | United Kingdom | 414/622 |

Primary Examiner—David A. Bucci
Attorney, Agent, or Firm—Marshall & Melhorn

[57] ABSTRACT

A sheet handling apparatus adapted for attachment to a fork lift truck for transporting stacks of vertically disposed sheet material from one location to another. The apparatus includes a frame adapted for attachment to the forks of a fork lift truck and a lower support for supporting the lower edges of the sheets. The lower support is adjustably connected to the frame permitting vertical adjustment of the lower support relative to the frame. The apparatus also includes an upper support pivotally mounted on the frame for engaging the back side of the stack during transport.

13 Claims, 3 Drawing Sheets

GLASS HANDLING APPARATUS

BACKGROUND OF THE INVENTION

The present invention relates generally to the handling of sheet material and more particularly to an apparatus adapted for attachment to a fork lift truck for the transport of a stack of vertically supported fragile sheet material, such as glass, for example.

In the glass industry it is customary for convenience and ease of handling to store sheets of glass, such as automotive and architectural glass on edge in a generally upright position for processing, shipping, and storage. The sheets are individually stacked on transport pallets, racks, or in shipping containers at the end of a processing line either manually or automatically by sheet handling devices which are prevalent in present manufacturing facilities. The number of sheets in individual stacks vary depending on need and current use.

It is often necessary to transfer a stack of sheets from one support or container to another. This need arises, for example, in factory warehouses where sheets are transferred from a temporary support utilized during processing to permanent type racks utilized to store glass for future use. Conversely, the need to transfer a stack of sheets from a permanent storage rack to a pallet or shipping container, for example, also arises. A similar need manifests itself in the supply industry wherein warehouses are established for storing, for example, automotive glass for the glass replacement market and architectural glass for the building industry. The glass sheets are typically shipped to the supply warehouses in shipping containers accommodating a plurality of vertically supported sheets, The sheets are then transferred from the shipping containers to permanent storage racks where they are stored until needed.

Typically, to transfer a stack of sheets from one location to another, for example, from a shipping container or pallet to a storage rack, it has been customary to manually remove one sheet at a time from the shipping container and transfer it to the storage rack. Such a procedure is very time consuming and laborious adding to the cost of the operation. Transferring each sheet individually also increases the potential for accidental damage to the glass sheets or injury to the handler.

An early attempt at transporting a plurality of vertically disposed plates is disclosed in U.S. Pat. No. 1,753,578. The invention relates to a conveyor hook suspended from an overhead block and is particularly adapted for transporting a plurality of identical units, such as steel plates or the like, placed in edgewise relation from a storage rack.

More recently, an improved sheet handling device for moving a vertically supported batch of sheets has been developed, as disclosed in U.S. Pat. No. 4,522,544. The device is suspended from a lifting hook of a crane and is designed to separate a batch of sheets from a stack or add a batch to a stack. The device makes it more practical to store and transport larger stacks of sheets.

A gripper apparatus preferably mounted on the end of a robot arm for stacking a batch of glass sheets is disclosed in U.S. Pat. No. 4,673,325. The apparatus comprises a gripper head having a sheet support for movement to grip the batch of sheets, a roller stop at the bottom of the support and at least one clamp movable at the top of the support to grip the batch against the sheet support.

Although the above sheet handling apparatus are important advancements in the expeditious transferring of a stack of sheets from one location to another, they do present certain limitations in that the range of transfer is confined to the reach of the overhead conveyor in the first two mentioned systems and the robot in the last mentioned system.

U.S. Pat. No. 4,394,106 discloses a glass pack lifting frame which is adapted to attach to the lift mast of an industrial lift truck. The lifting frame includes gripping devices at the sides for engaging the sides of the glass pack and feet at the bottom for supporting the bottom of the pack. The invention provides a lift mechanism with greater range for accurate placement and orientation of a pack of glass sheets. While the mechanism is well suited for handling large sheets of glass, the size and relatively complex structure of the mechanism would present certain limitations for handling sheets of substantially smaller proportions.

SUMMARY OF THE INVENTION

The present invention relates to a sheet handling apparatus of simple, compact structure which is readily attachable to a conventional fork lift truck that provides mobility and relatively unlimited range. The apparatus is particularly suited for transferring stacks of vertically disposed fragile sheet material from one location to another.

Although the lift truck provides the mobility and range desired in this particular application, it is well known that a change in elevation of the fork members of the truck, ie., raising and lowering the forks relative to the truck, is accompanied by an unavoidable uneven, jolting motion. Unfortunately, the jolting or jerking motion is translated to the sheet supporting means and if the lift mechanism of the truck is used to initially raise the sheets from the support, the inherent jolting motion of the forks will cause an undesirable sharp impact on the bottom edge of the sheets occasionally resulting in damage thereto.

To overcome the potential for damage caused by the jolting motion of the forks, the present invention comprises an apparatus that includes a frame adapted for attachment to the forks of a fork lift truck for movement therewith and a unique lower sheet supporting means such as a pair of horizontally extending fork members for supporting the lower edge of the sheets that is vertically movable relative to the frame. A pair of axially aligned nuts are mounted on the frame for receiving an elongated screw that has one end attached to the lower supporting means and the other end adapted for rotation by a torque transmitting device. Rotation of the screw effects relative vertical movement between the sheet supporting means and the frame. Careful control of the speed and consistency of rotation by an operator will provide a smooth vertical motion to the sheet supporting means allowing the operator to gently bring the lower supporting means into engagement with the bottom edge of the sheets. After engagement, rotation of the screw is continued to transfer support of the stack to the sheet handling apparatus. Thus, there is provided a sheet handling apparatus, propelled by a fork lift truck, that includes independently operated sheet supporting means for smoothly raising or lowering a stack of vertically oriented sheets relative to a support surface. After the stack is entirely supported by the sheet supporting means or forks of the handling apparatus, the lift mechanism of the truck can be utilized to carefully manipulate the supported stack as desired without concern of damage to the sheets caused by sudden impact of the supporting means.

It is therefore, a primary object of the invention to produce an improved sheet handling apparatus for transporting a stack of vertically oriented fragile sheet material from one location to another.

Another object of the invention is to produce a sheet handling apparatus of simple construction, compact in size, and adpated for attachment to the forks of a conventional fork lift truck.

Another object of the invention is to produce a sheet handling apparatus with independent control of the sheet supporting means to reduce sudden impact to the bottom edge of the sheets.

Yet another object of the invention is to produce an independent control for a sheet handling apparatus which is relatively simple and easily manipulated.

BRIEF DESCRIPTION OF THE DRAWINGS

The above objects and advantages of the invention will become readily apparent to one skilled in the art from reading the following detailed description of a preferred embodiment, when considered in the light of the attached drawings, in which.

DESCRIPTION OF THE PREFERRED EMBODIMENT

Fork lift trucks are typically utilized in industrial plants and warehouses for transferring heavy loads from one location to another. The loads are generally supported on pallets that are designed to receive the load bearing forks of the truck.

Figure 1:
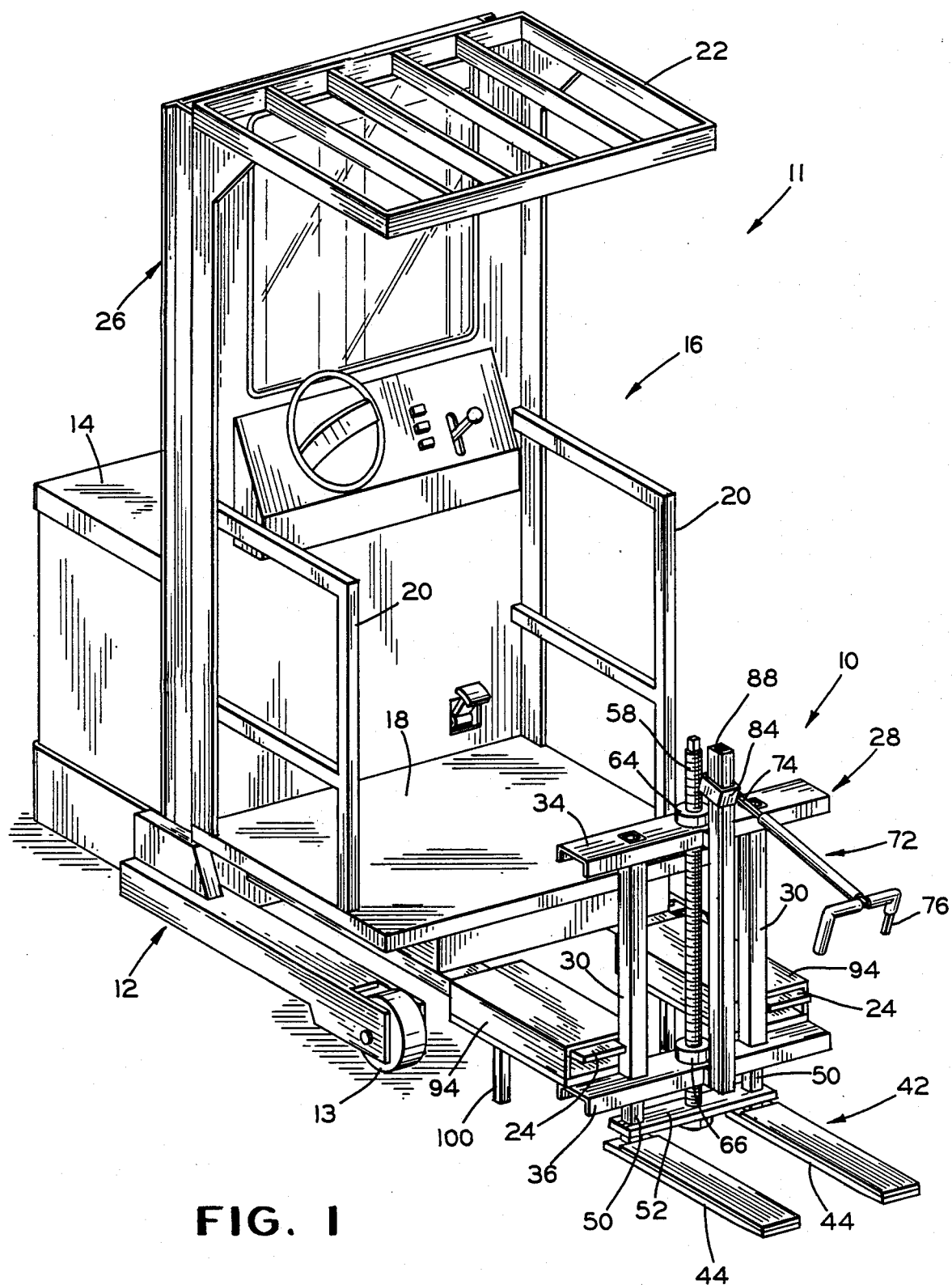
FIG. 1 is a perspective view of the sheet handling apparatus in accordance with the present invention attached to a typical fork lift truck.

Referring now in detail to the drawings, there is illustrated in FIG. 1, an improved sheet handling apparatus, generally designated 10, constructed in accordance with the present invention attached to a conventional fork lift truck 11. The truck 11 comprises a structural framework 12 supported on wheels 13, only one of which is shown, and is powered by suitable drive means such as industrial batteries, for example, housed in a compartment 14 mounted on the framework 12. An operator control station, generally designated 16, includes an operator platform 18, side rails 20 and overhead grate 22 for the safety and protection of the operator and sutiable controls for operation of the lift truck. Attached to the underside of the platform 18 in cantilevered fashion is a pair of horizontally extending load bearing forks 24. The operator control station is operatively connected to a lifting mast assembly 26 mounted on the framework 12. The lifting mast assembly 26 functions to raise and lower the control station 16 and its associated forks 24.

As previously mentioned, fork lift trucks are utilized for transferring loads supported on pallets or the like, from one location to another. The loads being transferred are generally adequately secured to the pallet and require no additional support. However, if it is desired to remove a sheet or a stack of sheets from a pallet and transfer the now unsecured load to another location it can be appreciated that support provided by the truck alone will not suffice and additional support to the load is necessary. In accordance with the present invention there is provided an improved load handling apparatus particularly suited for handling vertically stacked fragile sheet material such as glass.

While the invention will be described in connection with the handling of a stack of fragile glass sheets such as automotive glass, it should be understood that the apparatus of the invention is not restricted to the handling of automotive glass, but also has utility in handling other material, sheet or otherwise, that is fragile and requires that extra care be exercised to avoid damage thereto.

Figure 2:
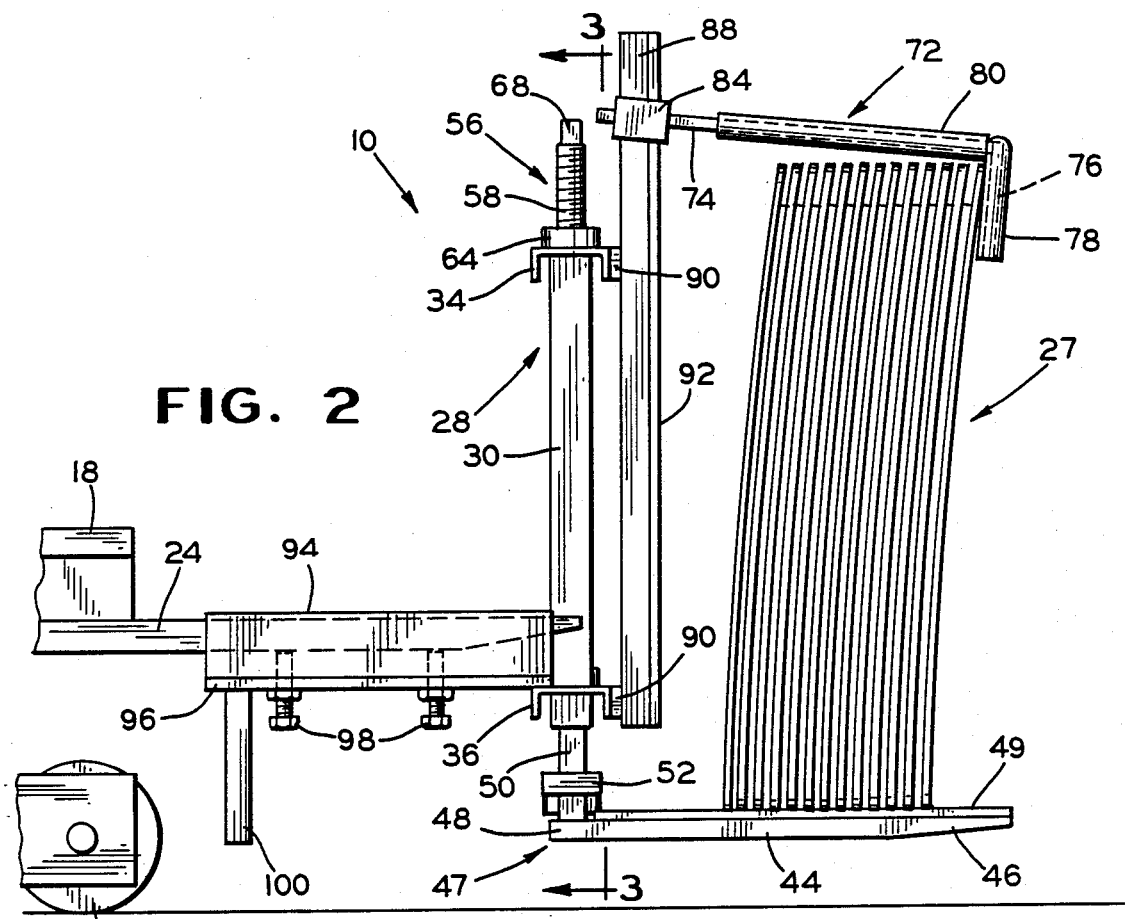
FIG. 2 is a side elevational view of the present invention supporting a stack of vertically oriented sheets with the lift truck broken away for convenience.
Figure 3:
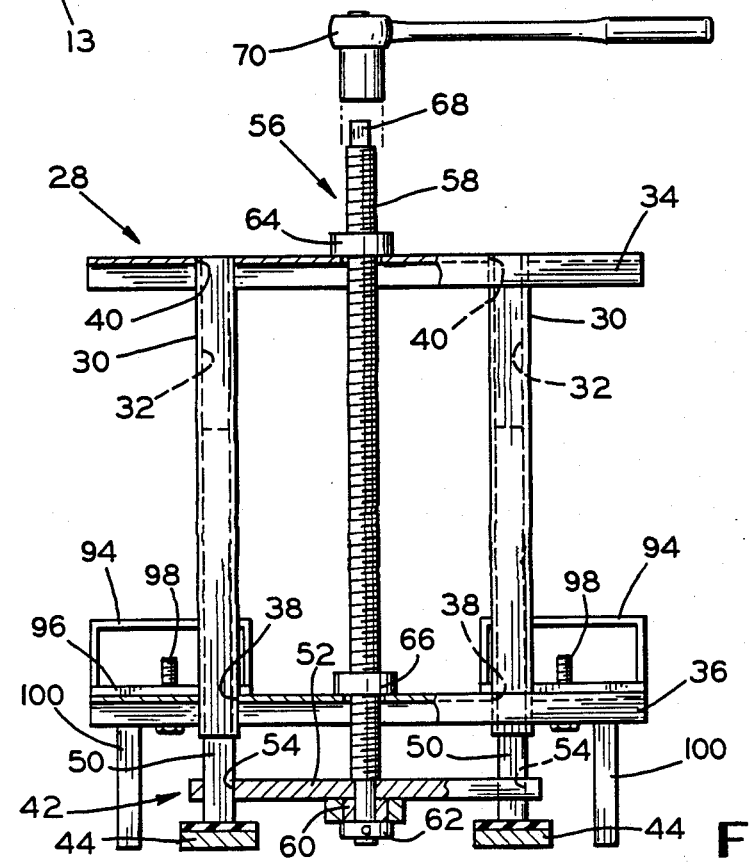
FIG. 3 is a cross sectional view of the present invention taken substantially along line 3—3 of FIG. 2 with the fork truck mechanism removed for clarity.

Referring now to FIGS. 1-3, there is illustrated the sheet handling apparatus 10 of the invention. FIG. 2 shows the apparatus 10 supporting a plurality of vertically stacked sheet material 27, such as automotive windshields, eg. The sheet handling apparatus 10 includes a frame, generally designated 28, comprising a pair of vertical tubular members 30 having axial passageways 32, disposed in a generally parallel relationship and joined at their opposite ends by a pair of upper and lower horizontally extending channel members 34 and 36, respectively.

The lower channel member 36 is provided with appropriate apertures 38 in alignment with the tubular members 30 to permit access to the lower end of respective passageways 32 for reasons to be explained hereafter. The upper channel member 34 may be provided with appropriate apertures 40, if desired, for structural integrity.

A lower support means, generally designated 42, for supporting the lower edge of the stack of sheet material 27 is adjustably connected to the frame 28 in a manner permitting vertical adjustment of the lower support means 42 relative to the frame 28, as will be appreciated by the following explanation. The lower support means 42 comprises a pair of horizontally extending fork members 44 having forward portions 46 and rearward portions 48. Suitable resilient pads 49 are adhered to the top surface of the fork members 44 to provide protection for the lower edges of the glass sheets. Mounted on the rearward portion of each fork member 44 and substantially normal thereto, is an upstanding post 50. The posts 50, as best shown in FIG. 3, are fixed in a generally parallel disposition by means of a connecting plate 52 joining the posts adjacent the lowermost ends. The posts 50 are mounted in suitable openings 54 provided in plate 52 and rigidly affixed thereto, as by welding. The cross section and spacing of the posts 50 is such that they may be telescopingly received within the axial passageways 32 of the tubular members 30 and possess free movement therein.

An adjusting means 56 operatively connects the lower support means 42 to the frame 28 and provides smooth vertical adjustment thereof as will now be explained. The adjusting means 56 includes an elongate screw 58 attached for rotation at the lowermost end to plate 52 intermediate posts 50 by means of a bushing or bearing 60 and retaining collar 62. Mounted on horizontal members 34 and 36 over apertures provided are axially aligned nuts 64 and 66, respectively, for threadably receiving and supporting the screw 58. The uppermost end of the screw 58 is provided with a suitable head 68 for matingly receiving a torque transmitting device such as a rachet tool 70, for effecting rotation of the screw and thus relative movement between the adjusting means 56 and frame 28.

Figure 4:
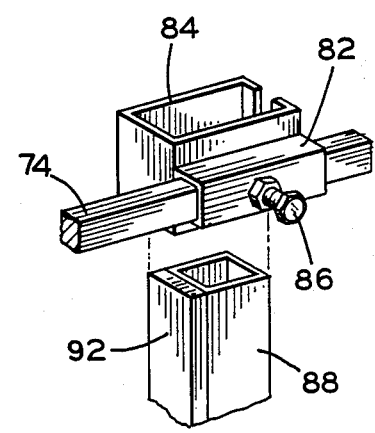
FIG. 4 is an enlarged fragmentary perspective view of the upper arm assembly of the present invention illustrating the adjustable feature thereof.

An upper support means 72 for supporting the back side of the stack of sheet material 27 is attached to the frame 28. The support means 72, as best shown in FIGS. 1, 2 and 4, comprises an elongated arm 74 having one end equipped with a downwardly extending portion 76 for engaging the back side of the last sheet of the vertical stack of sheets 27. The downwardly extending portion 76 is U-shaped and it and a substantial portion of the arm 74 is provided with cushioning sleeves 78 and 80, respectively, to prevent damage to the fragile material. The opposite end of the elongated arm 74 is telescopingly received in a tubular support 82 affixed to a collar 84. The arm 74 is axially adjustable with respect to the tubular support 82 and is fixed in a given position by set screw 86. A vertical support post 88 for supporting the upper support means 72 is affixed to the upper and lower horizontal members 34 and 36 of the frame 28 by means of spacers 90. The collar 84 and the vertical post 90 are so dimensioned to permit the collar 84 to be slidably received on the post 90 and frictionally retained at any desired position thereon. Such an arrangement also permits limited pivotable movement of the arm 74 relative to the post 88 allowing the upper support means 72 to automatically adjust to the change in elevation of the lower support means 42 when raising and lowering the stack of sheets relative to the frame 28. The post 90 is also provided with a resilient pad 92 to protect the fragile sheet material in case of accidental contact therewith.

Attached to the back side of the frame 28 are a pair of inverted U-shaped channel members 94 for receiving the forks 24 of the lift truck 11. The channel members are fixed to plates 96 which in turn are affixed as by welding, to lower channel member 36. The plates 96 are provided with set screws 98 to securely retain the forks 24 in the channel members 94 during transit. Adjacent the rearward end of each plate 96 is a leg 100 for supporting the apparatus 10 in an upright position when not supported by the fork lift truck.

Figure 5:
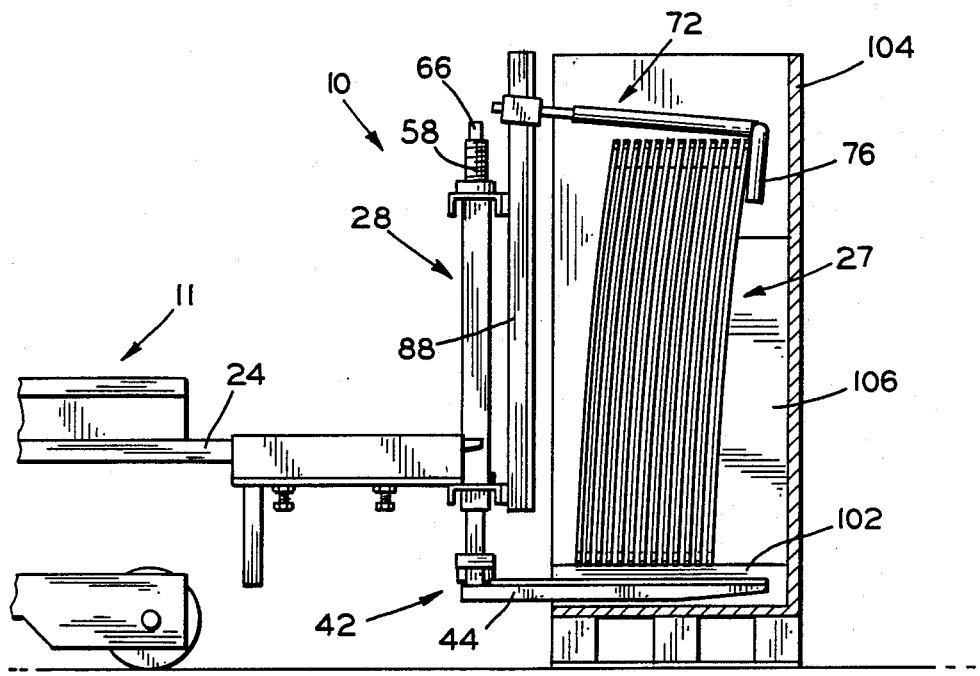
FIG. 5 is a diagrammatic side elevational view illustrating the apparatus of the present invention in position to raise a stack of vertically oriented sheets from the support of a shipping container.
Figure 6:
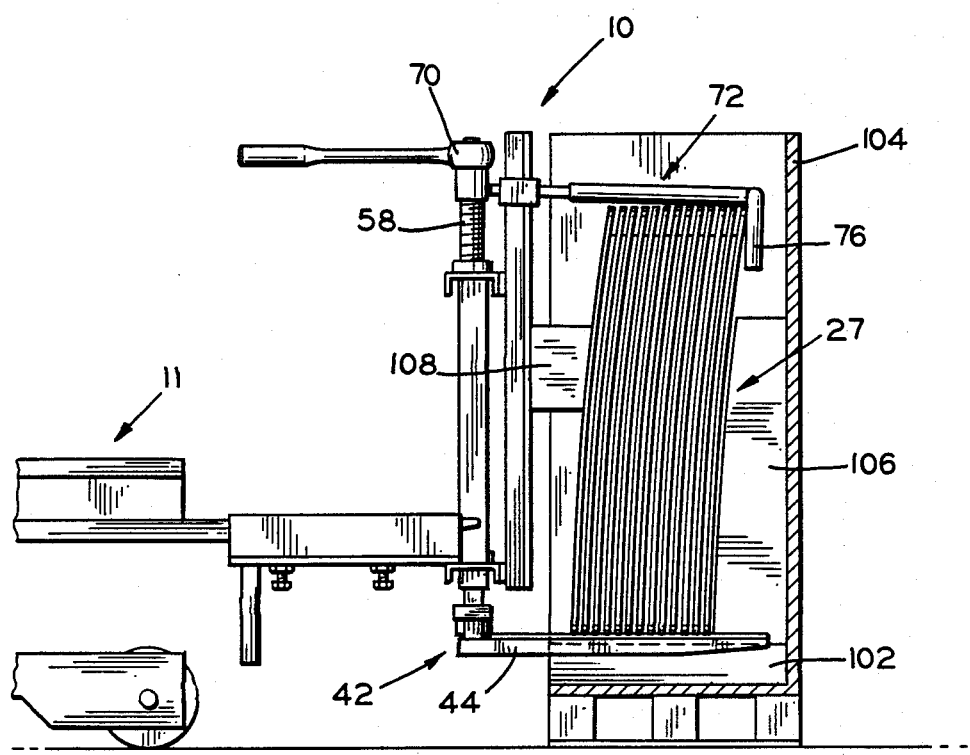
FIG. 6 is a diagrammatic view similar to FIG. 5 illustrating the stack in an elevated position supported entirely by the apparatus of the present invention.

In operation, with reference to FIGS. 5 and 6, the sheet handling apparatus 10, attached to the forks 24 of the truck 11 is positioned in front of a stack of sheets 22 to be transferred that is supported on blocks 102 of a shipping container 104. The sheets are supported in the container in a generally upright position by means of a back support 106. The forks 44 are initially maneuvered to extend slightly below and well beyond the back side of the stack 27. After the forks 44 are properly situated, the upper support member 72 is positioned on the post 88 so that the downwardly extending portion 76 engages the back side of the last sheet of the stack 27 as shown in FIG. 5. At this time, a ratchet wrench 70 or similar tool is employed to rotate the screw 58 elevating the lower support member 42 into gentle engagement with thebottom edge of the stack and then continuing rotation of the screw until the stack is raised above the support blocks 102 as indicated in FIG. 6. A wedge 108 may be conveniently placed in between the front sheet of the stack 27 and the post 88, if desired, to preclude accidental tipping of the stack. The vertical stack 27 is now entirely supported by the sheet handling apparatus 10 of the invention and may be safely and conveniently transported to another location. The procedure just described is simply reversed when depositing the stack at the new location.

Thus, there has just been described sheet handling apparatus for safely transporting a vertical stack of sheets from one location to another. The apparatus of the invention is adapted for attachment to a conventional fork lift truck to provide maximum mobility and overcomes the potential damage to the fragile sheet material caused by the typical uneven jolting, lifting motion of the truck.

It is to be understood that the form of the invention herewith illustrated and described is to be taken as an illustrative embodiment only of the same, and that various changes in the shape, size, and arrangement of parts, as well as procedural changes, may be resorted to without departing from the spirit of the invention.

What is claimed is:

1. Apparatus for handling fragile sheet material comprising:
    a frame;
    means for attaching said frame to a transport mechanism;
    sheet support means for supporting a lower edge of the sheet material; and
    adjusting means operatively connecting said sheet support means to said frame for effecting vertical adjustment of said sheet support means relative to said frame said adjusting means including an elongate screw having one end connected to said sheet support means and a nut affixed to said frame threadably receiving said elongate screw.

2. Apparatus according to claim 1, including second sheet support means for supporting a back side of the sheet material.

3. Apparatus according to claim 1 wherein said elongate screw includes a second end adapted to receive a torque transmitting device whereby rotation of said elongate screw will effect relative movement between said sheet support means and said frame.

4. Apparatus according to claim 1 wherein said frame comprising a pair of tubular members vertically disposed in spaced parallel relationship, said tubular members having axial passageways, upper and lower horizontal members connecting said pair of tubular members at the opposite ends thereof to form a generally box-like structure, said lower horizontal member having apertures in alignment with and corresponding substantially to said axial passageways, and said sheet support means including a horizontal plate having a pair of spaced parallel upright members in axial alignment with said axial passageways and telescopingly received therein.

5. Apparatus according to claim 4 wherein said adjusting means includes a pair of axially aligned nuts fixed to said upper and lower horizontal members, respectively, in alignment with appropriate openings provided therein, said elongate screw threadably supported by said pair of axially aligned nuts and having said one end operatively connected to said horizontal plate and the distal end adapted to receive a torque transmitting device whereby rotation of said elongate screw will effect relative movement between said sheet support means and said frame.

6. Apparatus according to claim 5 including second sheet suport means for supporting a back side of the sheet material.

7. Apparatus according to claim 6 wherein said second sheet support means including a vertical post, an elongate arm, means for attaching said elongate arm to said vertical post, said elongate arm having one end adapted for engagement with the back side of the sheet material.

8. Apparatus according to claim 7 wherein said vertical post including a predetermined cross-section and said attaching means comprises a collar having a cross-section generally corresponding to and slightly larger than said predetermined cross-section, said collar telescopingly mounted on said vertical post and including means for supporting said elongate arm.

9. Apparatus according to claim 8 wherein said vertical post is affixed to said frame and said elongate arm is vertically pivotable.

10. Apparatus according to claim 8 wherein said vertical post is affixed to said frame and said arm supporting means permits axial adjustment of said elongate arm with respect to said collar.

11. Apparatus according to claim 10 wherein said transport mechanism comprises a lift truck having at least one fork member and including means for raising and lowering said at least one fork member, and said means for attaching including at least one channel member affixed to said frame for receiving said at least one fork member.

12. An apparatus adapted for use with a left truck for handling a stack of generally vertically oriented frangible sheets, the lift truck including at least one fork member having one end operatively connected to the lift truck and the opposite end extending outwardly therefrom and means for raising and lowering said at least one fork member, said apparatus comprising a generally box-like frame including a pair of parallel vertically disposed tubular members joined at their opposite ends by upper and lower horizontal members, means on said frame adapted for attachment to said at least one fork member, first support means for supporting the lower edge of the stack and including a pair of parallel upright members telescopingly received in said tubular members, vertical adjusting menas operatively connecting said first support means to said frame providing relative movement therebetween, said adjusting means including an elongate screw having one end connected to said first support means and a nut affixed to said box-like frame threadably supporting said elongate screw, and second support means mounted on said frame for engaging the back side of the stack to maintain the stack substantially vertical.

13. An article handling apparatus for frangible sheets adapted for attachment to the forks of a fork lift truck comprising:

a frame;

means on said frame for releasably attaching said frame to the fork;

support means for supporting the bottom of the article; and adjusting means operatively connecting said support means to said frame for effecting vertical adjustment of said support means relative to said frame, said adjusting means including an elongate screw having one end connected to said support means and a nut affixed to said frame threadably supporting said elongate screw.

* * * * *